United States Patent
Park et al.

(10) Patent No.: US 7,477,332 B2
(45) Date of Patent: Jan. 13, 2009

(54) LIQUID CRYSTAL DISPLAY DEVICE AND METHOD FOR REMOVING RESIDUAL CHARGE

(75) Inventors: Soon-Young Park, Gyoungsangnam-Do (KR); Deok-Won Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 683 days.

(21) Appl. No.: 10/673,144

(22) Filed: Sep. 30, 2003

(65) Prior Publication Data

US 2004/0125308 A1      Jul. 1, 2004

(30) Foreign Application Priority Data

Dec. 31, 2002   (KR)   ..................... 10-2002-0088425

(51) Int. Cl.
*G02F 1/1333*  (2006.01)
(52) U.S. Cl. ...................................................... 349/40
(58) Field of Classification Search ............. 349/40–43, 349/54–55
See application file for complete search history.

(56) References Cited

U.S. PATENT DOCUMENTS

| | | | | |
|---|---|---|---|---|
| 5,471,329 A | * | 11/1995 | Nakajima et al. | 349/54 |
| 6,081,307 A | * | 6/2000 | Ha | 349/40 |
| 6,246,074 B1 | * | 6/2001 | Kim et al. | 257/48 |
| 6,333,769 B1 | * | 12/2001 | Suzuki et al. | 349/40 |
| 6,493,047 B2 | * | 12/2002 | Ha | 349/40 |
| 6,624,857 B1 | * | 9/2003 | Nagata et al. | 349/54 |
| 6,975,285 B2 | * | 12/2005 | Myung | 345/60 |

* cited by examiner

*Primary Examiner*—Dung T. Nguyen
(74) *Attorney, Agent, or Firm*—Morgan Lewis & Bockius LLP

(57) ABSTRACT

A liquid crystal display device for removing residual charge includes a plurality of data lines and a plurality of gate lines arranged along vertical and horizontal directions, respectively, on a transparent substrate, a source driver for supplying data voltage to the data lines, a gate driver for supplying gate voltage to the gate lines, and a plurality of common voltage lines connected to the data lines and the gate lines through a plurality of static electricity preventing units, wherein at least one of the static electricity preventing units is directly connected to the source driver.

19 Claims, 3 Drawing Sheets

LIQUID CRYSTAL DISPLAY DEVICE AND METHOD FOR REMOVING RESIDUAL CHARGE

The present invention claims the benefit of Korean Patent Application No. P2002-088425 filed in Korea on Dec. 31, 2002, which is hereby incorporated by reference.

BACKGROUND OF THE INVENTION

1. Field of the Invention

The present invention relates to a liquid crystal display device and, more particularly, to a liquid crystal display device for removing residual charge.

2. Discussion of the Related Art

In general, a liquid crystal display device includes a TFT substrate, which includes gate lines and data lines arranged in a matrix configuration and a thin film transistor (TFT) is formed at the intersection of the gate and data lines, a color filter substrate attached to the TFT substrate, and a liquid crystal material layer filled between the TFT and color filter substrates. In addition, a pixel electrode and a common electrode are formed with the liquid crystal material layer therebetween, wherein light transmittance of the liquid crystal material layer is controlled by supplying a voltage to both the pixel and common electrodes. Furthermore, the gate lines and the data lines are, respectively, connected to a gate driver and a data driver to receive a gate voltage and a data voltage, respectively.

FIG. 1 is a schematic cross sectional view of a liquid crystal display device according to the related art. In FIG. 1, a common voltage line 110 is formed on a first transparent substrate 100, a common electrode 130 is formed on a second transparent substrate 120, and a silver dot 140 is electrically interconnecting the common voltage line 110 and the common electrode 130. The common voltage line 110 is formed on the first transparent substrate 100 and receives a common voltage (Vcom). Accordingly, the common voltage (Vcom) is supplied to the common electrode 130 of the second transparent substrate 120 through the silver dot 140.

Although not shown, the common voltage line 110 is connected to a gate line and a data line through a static electricity preventing device. Accordingly, the static electricity preventing device is turned ON when a high voltage static charge flows into a liquid crystal display device to disperse the static charge to every gate line and data line, thereby preventing damage to the liquid crystal display device by the static charge.

In order to prevent degradation of the liquid crystal material, the liquid crystal display device employs a dot inversion method in which the liquid crystal material is operated by an AC voltage. Accordingly, a data voltage is inverted for every frame centering around the common voltage (Vcom) that is supplied to the common electrode 130. So that a data voltage with the same size as that of a data voltage supplied from an odd frame can be supplied to an even frame, a common voltage (Vcom) in consideration of a kick back effect owing to a parasitic capacitance of the TFT should be applied to the common electrode 130 of the second transparent substrate 120. Accordingly, since the kick back voltage works in the same direction as a gate voltage change, a lower common voltage (Vcom) than a central value of the inverted data voltage should be supplied. However, such voltage compensation has been made according to human vision, and thus an accurate compensation cannot be expected.

Failure to supply an accurate voltage compensation for the common voltage (Vcom) leads to accumulation of residual charge in the common voltage line 110 of the first transparent substrate 100 and in the common electrode 130 of the second transparent substrate 120. Accordingly, the residual electric charge should be discharged when the liquid crystal display device is turned OFF. However, discharging the static charge through the gate and data lines does not provide complete discharge such that even though the liquid crystal display device in an OFF state, the charge remains in the liquid crystal display device. In addition, as an overall size of the liquid crystal display device increases and image resolution improves, a line resistance increases in the liquid crystal display device, whereby the residual charge cannot be effectively removed with the discharge path.

When the residual charge is not properly discharged, a DC voltage is continuously supplied to the liquid crystal display device even if the liquid crystal display device is in an OFF state, causing a problem that an ionic contaminant (e-) is adsorbed and the TFT is degraded. Accordingly, the ionic contaminant generated due to an encapsulation material around a liquid crystal injection opening results in an abnormal stain, causing defects in the liquid crystal display device and degrading image quality.

SUMMARY OF THE INVENTION

Accordingly, the present invention is directed to a liquid crystal display device and method for removing residual charge that substantially obviates one or more of the problems due to limitations and disadvantages of the related art.

An object of the present invention is to provide a liquid crystal display device capable of effectively discharging a residual charge of a liquid crystal display device.

An object of the present invention is to provide a method for removing residual charge from a liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device for removing residual charge includes a plurality of data lines and a plurality of gate lines arranged along vertical and horizontal directions, respectively, on a transparent substrate, a source driver for supplying data voltage to the data lines, a gate driver for supplying gate voltage to the gate lines, and a plurality of common voltage lines connected to the data lines and the gate lines through a plurality of static electricity preventing units, wherein at least one of the static electricity preventing units is directly connected to the source driver.

In another aspect, a liquid crystal display device for removing residual charge includes a plurality of data lines and a plurality of gate lines arranged along vertical and horizontal directions, respectively, on a transparent substrate, a source driver for supplying data voltage to the data lines, a source printed circuit board for supplying a gate signal, a data signal, and a control signal to the source driver, a gate driver for supplying gate voltage to the gate lines, and a plurality of common voltage lines connected to the data lines and the gate lines through a plurality of static electricity preventing units, wherein at least one pathway of the residual charge flows to ground directly through the source driver and the source printed circuit board.

In another aspect, a liquid crystal display device for removing residual charge includes a plurality of data lines and a plurality of gate lines arranged along vertical and horizontal directions, respectively, on a transparent substrate, a source driver for supplying data voltage to the data lines, a source printed circuit board for supplying a gate signal, a data signal, and a control signal to the source driver, a gate driver for supplying gate voltage to the gate lines, and a plurality of common voltage lines connected to the data lines and the gate lines through a plurality of static electricity preventing units, wherein at least one pathway of the residual charge flows to ground through driver circuitry of the source driver and the source printed circuit board.

In another aspect, a method for removing residual charge from a liquid crystal display device includes providing a first dummy line connected to each one of a plurality of gate lines, providing a second dummy line connected to each of a plurality of data lines, providing a plurality of static electricity preventing units between each of the gate lines and the first dummy line, between each of the data lines and the second dummy line, and between the first and second dummy lines, providing a source driver for supplying data voltage to the data lines, providing a source printed circuit board for supplying voltage signals to the source driver, providing a gate driver for supplying gate voltage to the gate lines, and providing a plurality of common voltage lines connected to the data lines and the gate lines through the plurality of static electricity preventing units, wherein at least one pathway of the residual charge flows to ground from the first dummy line through the source driver and the source printed circuit board.

In another aspect, a method for removing residual charge from a liquid crystal display device includes providing a liquid crystal panel, the liquid crystal panel including a plurality of data lines and a plurality of gate lines arranged along vertical and horizontal directions, respectively, on a transparent substrate, a source driver for supplying data voltage to the data lines, a source printed circuit board for supplying a gate signal, a data signal, and a control signal to the source driver, a gate driver for supplying gate voltage to the gate lines, and a plurality of common voltage lines connected to the data lines and the gate lines through a plurality of static electricity preventing units, connecting at least one pathway to ground through the source driver and the source printed circuit board, and discharging the residual charge through the pathway.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
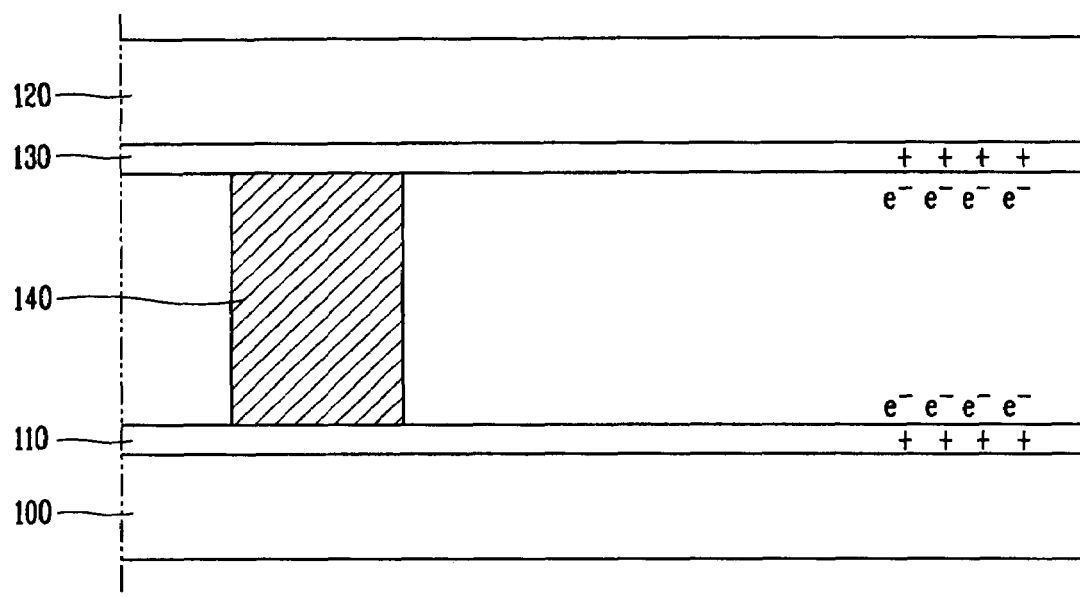
FIG. 1 is a schematic cross sectional view of a liquid crystal display device according to the related art.
Figure 2:
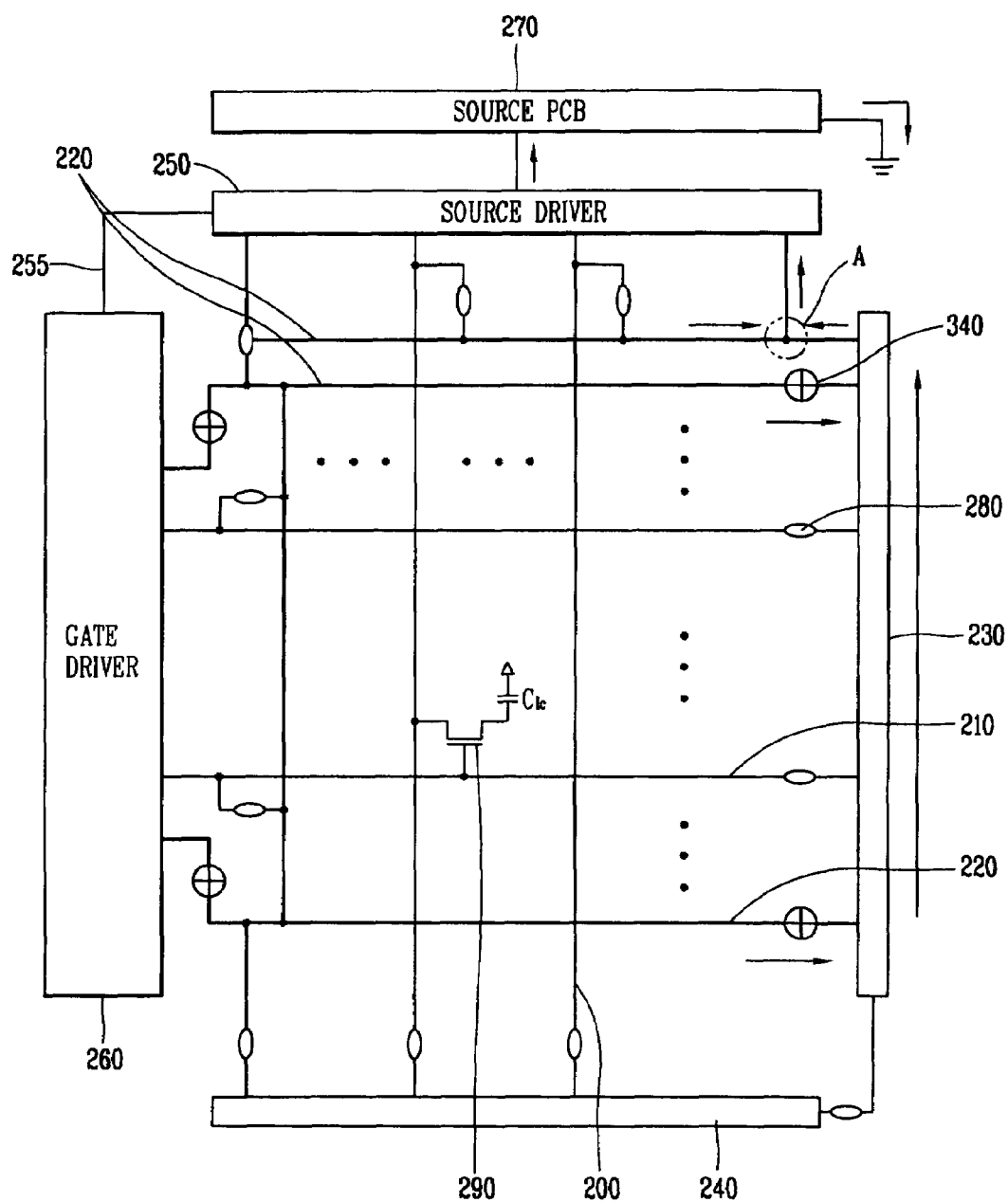
FIG. 2 is a schematic circuit diagram of an exemplary liquid crystal display device according to the present invention.

FIG. 2 is a schematic circuit diagram of an exemplary liquid crystal display device according to the present invention, and illustrates a liquid crystal display device driven in a twisted nematic (TN) mode. The TN mode liquid crystal display device may be constructed such that a pixel electrode may be formed at a pixel region of a TFT substrate and a common electrode may be formed at an entire surface of a color filter substrate. Between the two substrates, a liquid crystal material may be arranged to be consecutively twisted at 90°. When a data voltage and a common voltage are supplied to the pixel electrode and the common electrode, the liquid crystal material may become rearranged and light transmittance may be controlled.

In FIG. 2, data lines 200 and gate lines 210 may be arranged along vertical and horizontal directions, respectively, on a transparent substrate (not shown), such as glass, and a TFT 290 may be formed at the intersection of the data and gate lines 200 and 210. When a data voltage is supplied to a liquid crystal material by the TFT 290, the data voltage may be maintained for one frame by a liquid crystal capacitor (Clc). In addition, a common voltage line 220 may be formed along an outer side of the gate line 210.

In FIG. 2, at least one silver dot 340 may be formed at the common voltage line 220 to supply a common voltage (Vcom) to the common electrode of the color filter substrate. Accordingly, the data line 200 may be connected to the source driver 250 and the gate line 210 may be connected to the gate driver 260.

The source driver 250 may be connected to a source printed circuit board (PCB) 270 that may include a timing controller to convert image data input from a graphic controller, such as a computer, into a digital signal so as to be processed by the source driver 250. In addition, the timing controller may generate various control signals, such as a timing control signal, required for driving the source driver 250 and the gate driver 260.

The timing controller may receive a clock signal and horizontal/vertical synchronous signals (Hsync and Vsync), as well as an image data, from the graphic controller. Then, the timing controller may process the clock signal, the horizontal/vertical synchronous signals (Hsync and Vsync), and the image data to transmit a control signal according to the horizontal synchronous signal (Hsync), the vertical synchronous signal (Vsync), and the image data to the source driver 250.

Upon receiving the gate signal and the control signal from the source PCB 270, the source driver 250 may transmit them to the gate driver 260, wherein the source driver 250 and the gate driver 260 may be connected through a flexible printed circuit (FPC) 255 or may be connected by forming a line-on-glass (LOG) directly on the transparent substrate.

The gate driver 260 may sequentially select the gate lines 210 arranged along the horizontal direction and may generate a scan signal, while the source driver 250 may change a data signal to a data voltage and supply it to the data lines 200 arranged along the vertical direction. Accordingly, when the gate driver 260 selects the gate line 210 and supplies a gate voltage to turn ON the TFT 290, the source driver 250 may supply a data voltage to each pixel through each data line 200.

A pad (not shown) may be formed at one end of the data line 200 and one end of the gate line 210, to which the source driver 250 and the gate driver 260 are attached to supply the data voltage and the gate voltage to the data line 200 and gate line 210, respectively. A pad may also be formed at one end of the common voltage line 220 to receive a common voltage from the gate driver 260. The data lines 200 and the gate lines 210 may each be connected to the common voltage line 220 through first static electricity preventing units 280. Accordingly, the static electricity preventing units 280 may function as a switch and may include a plurality of transistors or a plurality of diodes, wherein the static electricity preventing units 280 may operate only when a high voltage is supplied thereto to create an electrical short circuit between the data and gate lines 200 and 210.

When static electricity is introduced into a liquid crystal display device, the static electricity preventing units 280 may disperse it to every data and gate line 200 and 210. Accordingly, when static electricity is introduced to one of the gate lines 210 and data line 200, the static electricity preventing units 280 connected thereto may operate to cause the static electricity to flow to the common voltage lines 220. Thus, the static electricity preventing units 280 connected to the common voltage lines 220 may operate to cause the static electricity to be dispersed to each of the lines 220. Since the dispersed static electricity has a relatively small energy and each line forms an equal potential due to the dispersed static electricity, the TFT 290 may not electrically break down.

The common voltage lines 220 may be connected to the source driver 250 through the static electricity preventing units 280. Accordingly, the static electricity preventing units 280 may function to cut off static electricity that may be introduced from an exterior of the liquid crystal display device. At least one of the plurality of common voltage lines 220 may be directly connected to the source driver 250 without passing through a static electricity preventing unit 280. Accordingly, residual charge may be discharged to the source driver 250 through a portion "A". Since a plurality of common voltage lines 220 may be directly connected to the source driver 250, static electricity may be introduced into the liquid crystal display device therethrough from outside. Thus, one common voltage line 220 may be directly connected to the source driver 250.

The other end of the gate line 220, of which one end may be provided with the pad, may be connected to a first dummy line 230 through the static electricity preventing units 280. Meanwhile, the other end of the data line 200, of which one end may be provided with the pad, may be connected to a second dummy line 240 through the static electricity preventing units 280. The first dummy line 230 and the second dummy line 240 may be interconnected through the static electricity preventing units 280. Since lines of the liquid crystal display device may be connected to each other through the static electricity preventing units 280, when static electricity occurs, every line may be electrically short-circuited and the static electricity may be dispersed.

Accordingly, in the liquid crystal display device described above, residual charges may be removed as follows, as shown by arrows in FIG. 2. When the liquid crystal display device is turned OFF, residual charge existing at the common voltage line 220 and at the common electrode of the color filter substrate may be released externally from the liquid crystal display device through a path having a relatively small resistance. Since the source PCB 270 of the liquid crystal display device has a ground terminal, the residual charge may be outwardly discharged through the ground terminal of the source PCB 270. Resistance factors in the path through which the residual charge reaches the source driver 250 may include the first dummy line 230, the second dummy line 240, the silver dot 340, the static electricity preventing units 280, the gate driver 260, and the FPC 255. Resistances of the first dummy line 230, the second dummy line 240, and the silver dot 340 may be neglected since they may be considerably smaller than resistances of the gate driver 260 and the FPC 255. Thus, the residual charge existing at the common voltage line 220 and the common electrode may be moved to the source driver 250 through the first dummy line 230 and released to the ground terminal of the source PCB 270.

In addition, the residual charge may flow along a pathway through the source driver 250 and the source PCB 270 to ground. For example, the residual charge may flow to ground through the source driver 250 without passing through any of the driver circuitry of the source driver 250. Accordingly, conductive line traces may be provided in the source driver 250 that do not pass through the driver circuitry of the source driver 250 Alternatively, the residual charge may flow through driver circuitry of the source driver 250 to ground through the source PCB 270.

Figure 3:
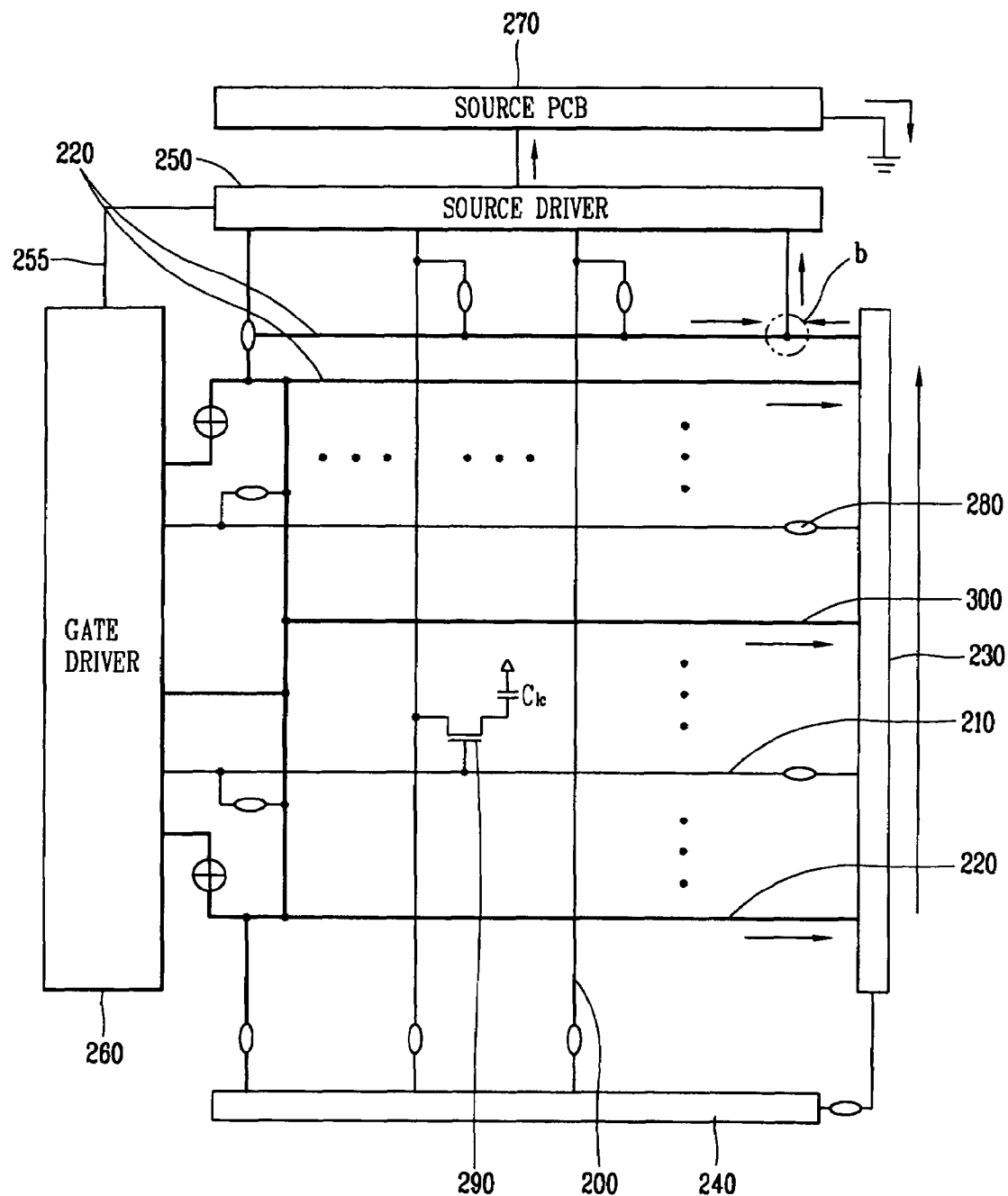
FIG. 3 is a schematic circuit diagram of another exemplary liquid crystal display device according to the present invention.

FIG. 3 is a schematic circuit diagram of another exemplary liquid crystal display device according to the present invention. In FIG. 3, a liquid crystal display device driven in an-In Plane Switching (IPS) mode is shown. Compared to the TN mode liquid crystal display device, which disadvantageously has a narrow viewing angle, the IPS mode liquid crystal display device solves the problem of viewing angle in such a manner that liquid crystal molecules are oriented in a substantially horizontal direction to the substrate. Unlike the TN mode liquid crystal display device, in the IPS mode liquid crystal display device, the pixel electrode and the common electrode are formed on the TFT substrate. The pixel electrode and the common electrode are arranged in parallel and generate in plane switching to control light transmittance of liquid crystal.

In FIG. 3, similar elements as those in FIG. 2 are given the same reference numerals, wherein descriptions of which have been omitted. In the TN mode liquid crystal display device of FIG. 2, the common voltage line 220is formed at the outer side of the gate line 210. However, in the IPS mode liquid crystal display device, plural common voltage lines 300 may be formed between gate lines 210 to form a common electrode of each pixel. The common voltage line 300 may be formed to extend to each pixel to form a common electrode. In addition, since the common electrode may be formed on the TFT substrate, no silver dots may be required to supply a common voltage to the color filter substrate. Thus, when a residual DC voltage is continuously supplied, residual charge is accumulated at the common voltage line 300 and the common electrode of the TFT substrate.

In the case of the IPS mode liquid crystal display device, like the TN mode liquid crystal display device, at least one common voltage line 220 may be provided with a low resistance path (b) directly connected to the source driver 250. Accordingly, residual charge may be released externally via the path (b) through the ground terminal of the source PCB 270 in the same manner as the case of the TN mode of FIG. 2. The movement path of the residual charge is shown by arrows.

It will be apparent to those skilled in the art that various modifications and variations can be made in the liquid crystal display device for removing residual charge of the present invention without departing from the spirit or scope of the inventions. Thus, it is intended that the present invention covers the modifications and variations of this invention provided they come within the scope of the appended claims and their equivalents.

What is claimed is:

1. A liquid crystal display device for removing residual charge, comprising:
   a plurality of data lines and a plurality of gate lines arranged along vertical and horizontal directions, respectively, on a transparent substrate;
   a source driver for supplying data voltage to the data lines;
   a gate driver for supplying gate voltage to the gate lines; and
   a plurality of common voltage lines connected to the data lines and the gate lines through a plurality of static electricity preventing units;
   a first dummy line connected to the gate lines and the common voltage lines through the static electricity preventing unit; and
   a second dummy line connected to the data lines and the common voltage lines through the static electricity preventing units,
   wherein at least one of the static electricity preventing units is directly connected to the source driver.

2. The device according to claim 1, wherein the common voltage lines receive a common voltage from the gate driver.

3. The device according to claim 1, wherein the gate driver is electrically connected to the source driver to receive a gate signal and a control signal.

4. The device according to claim 1, wherein the common voltage lines include at least one silver dot.

5. The device according to claim 1, further comprising a source printed circuit board for supplying a gate signal, a data signal, and a control signal to the source driver.

6. A liquid crystal display device for removing residual charge, comprising:
   a plurality of data lines and a plurality of gate lines arranged along vertical and horizontal directions, respectively, on a transparent substrate;
   a source driver for supplying data voltage to the data lines;
   a source printed circuit board for supplying a gate signal, a data signal, and a control signal to the source driver;
   a gate driver for supplying gate voltage to the gate lines;
   a plurality of common voltage lines connected to the data lines and the gate lines through a plurality of static electricity preventing units;
   a first dummy line connected to the gate lines and the common voltage lines through the static electricity preventing unit; and
   a second dummy line connected to the data lines and the common voltage lines through the static electricity preventing units,
   wherein at least one pathway of the residual charge flows to ground directly through the source driver and the source printed circuit board.

7. The device according to claim 6, wherein the common voltage lines receive a common voltage from the gate driver.

8. The device according to claim 6, wherein the gate driver is electrically connected to the source driver to receive a gate signal and a control signal.

9. The device according to claim 6, wherein the common voltage lines include at least one silver dot.

10. A liquid crystal display device for removing residual charge, comprising:
    a plurality of data lines and a plurality of gate lines arranged along vertical and horizontal directions, respectively, on a transparent substrate;
    a source driver for supplying data voltage to the data lines;
    a source printed circuit board for supplying a gate signal, a data signal, and a control signal to the source driver;
    a gate driver for supplying gate voltage to the gate lines;
    a plurality of common voltage lines connected to the data lines and the gate lines through a plurality of static electricity preventing units;
    a first dummy line connected to the gate lines and the common voltage lines through the static electricity preventing unit; and
    a second dummy line connected to the data lines and the common voltage lines through the static electricity preventing units,
    wherein at least one pathway of the residual charge flows to ground through driver circuitry of the source driver and the source printed circuit board.

11. The device according to claim 10, wherein the common voltage lines receive a common voltage from the gate driver.

12. The device according to claim 10, wherein the gate driver is electrically connected to the source driver to receive a gate signal and a control signal.

13. The device according to claim 10, wherein the common voltage lines include at least one silver dot.

14. A method for removing residual charge from a liquid crystal display device, comprising:
    providing a first dummy line connected to each one of a plurality of gate lines;
    providing a second dummy line connected to each of a plurality of data lines;
    providing a plurality of static electricity preventing units between each of the gate lines and the first dummy line, between each of the data lines and the second dummy line, and between the first and second dummy lines;
    providing a source driver for supplying data voltage to the data lines;
    providing a source printed circuit board for supplying voltage signals to the source driver;
    providing a gate driver for supplying gate voltage to the gate lines; and
    providing a plurality of common voltage lines connected to the data lines and the gate lines through the plurality of static electricity preventing units,
    wherein at least one pathway of the residual charge flows to ground from the first dummy line through the source driver and the source printed circuit board.

15. The method according to claim 14, wherein the pathway includes drive circuitry of the source driver.

16. The method according to claim 14, wherein the pathway excludes drive circuitry of the source driver.

17. A method for removing residual charge from a liquid crystal display device, comprising:
    providing a liquid crystal panel, the liquid crystal panel including:
        a plurality of data lines and a plurality of gate lines arranged along vertical and horizontal directions, respectively, on a transparent substrate;
        a source driver for supplying data voltage to the data lines;
        a source printed circuit board for supplying a gate signal, a data signal, and a control signal to the source driver;
        a gate driver for supplying gate voltage to the gate lines;
        a plurality of common voltage lines connected to the data lines and the gate lines through a plurality of static electricity preventing units;
        a first dummy line connected to the gate lines and the common voltage lines through the static electricity preventing unit; and a second dummy line connected to the data lines and the common voltage lines through the static electricity preventing units,
connecting at least one pathway to ground through the source driver and the source printed circuit board; and
discharging the residual charge through the pathway.

18. The method according to claim 17, wherein the pathway includes drive circuitry of the source driver.

19. The method according to claim 17, wherein the pathway excludes drive circuitry of the source driver.

* * * * *